Aug. 14, 1962 R. D. HAWKINS 3,049,344
VIBRATION AND SHOCK ISOLATOR
Filed Jan. 4, 1960

INVENTOR
ROBERT D. HAWKINS
BY
ATTORNEY

United States Patent Office 3,049,344
Patented Aug. 14, 1962

3,049,344
VIBRATION AND SHOCK ISOLATOR
Robert D. Hawkins, Greenlawn, N.Y., assignor to Sperry Rand Corporation, Great Neck, N.Y., a corporation of Delaware
Filed Jan. 4, 1960, Ser. No. 120
6 Claims. (Cl. 267—1)

This invention relates to a vibration and shock isolator of the elastic type that buckles under increasing load conditions. The spring constant of the isolator decreases as the condition of loading increases. The improved isolator is formed of a unitary or molded piece of resilient material such as rubber having an egg crate type of cell pattern with walls preferably arranged in a square geometrical configuration.

The resiliency of the structure and cell size for a particular unitary resilient piece are such as to provide isolation over a wide range of frequencies. The collapsible walls further provide adequate separation under steady load conditions. The walls buckle under shock vibration loads so that the spring characteristics of the improved isolator varies in a nonlinear manner. In the preferred embodiment, the structure includes a wall that closes one of the faces of the pattern.

An object of the invention is to construct an improved elastic type isolator that reduces the transmission of oscillatory motion over a wide range of vibrating frequencies including its resonant frequency.

The improved vibration shock isolators require no self-contained damping mechanism therewith and are readily sandwiched between the devices being coupled with resultant saving in space.

Further objects, features and structural details of the improved isolator will be apparent from the following description when read in relation to the accompanying drawings, wherein FIG. 1 is a perspective view showing a single dimensional use of the isolator in which four of the elastic pieces are sandwiched between a body such as a fixed base and a suitable vibratory body such as a housing;

Figure 1:
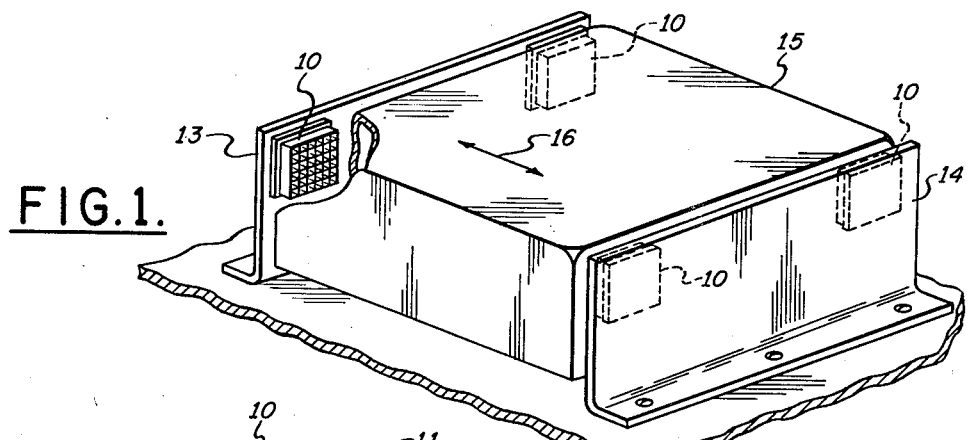
Figure 2:
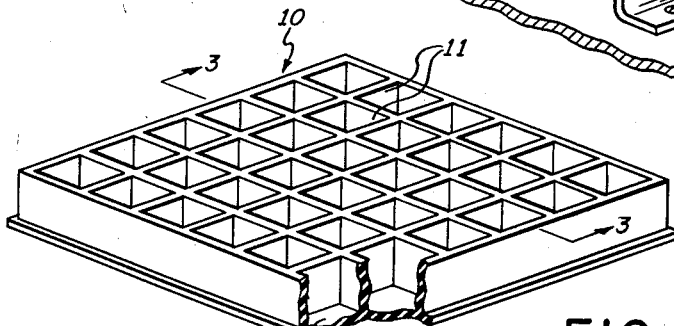
FIG. 2 is an enlarged perspective view of the open face of one of the isolators shown in FIG. 1.
Figure 3:
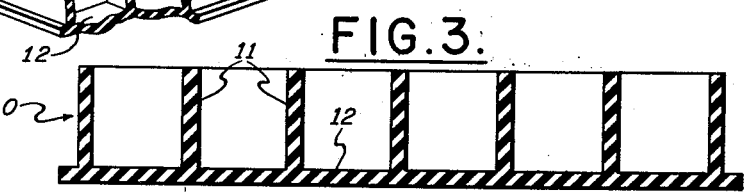
FIG. 3 is a further enlarged view of the isolator shown in FIG. 2, in section, the section being taken on line 3—3, FIG. 2.

An example of the structure of the improved isolator is shown in FIGS. 1, 2 and 3 of the drawing. As shown, the isolator is formed of a unitary or single piece of resilient material such as rubber that is molded in sheets of a desired size. The isolator has an egg crate cell pattern with walls that mutually brace each other and give the structure the necessary static load capacity. The resilient material of the isolator, the size and angular disposition of the walls of the pattern and overall dimensions of the isolator are design variables that are necessarily chosen to provide the best performance for a specific environment, load, and frequency range of operation. Isolators such as shown in FIG. 2 of molded silicone rubber, of a one-fourth inch thickness and with a load weight up to seven pounds per square inch have performed well at frequencies above forty-two cycles per second.

The isolator 10 shown in FIGS. 2 and 3 is a molded rubber piece of thirty-six cells of an egg crate type pattern with intersecting walls 11 that provide a buckling latticework of nonlinear spring characteristics. The side walls 11 of the cells shown have a square geometrical configuration. As shown, one of the faces of the pattern is closed in the unitary isolator by a base wall 12 that is perpendicular to and of the same thickness as the cell walls 11.

Figure 4:
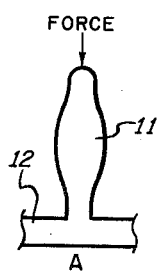
FIG. 4 is a series of cross sectional views of a wall of the improved isolator under different loading conditions.
Figure 5:
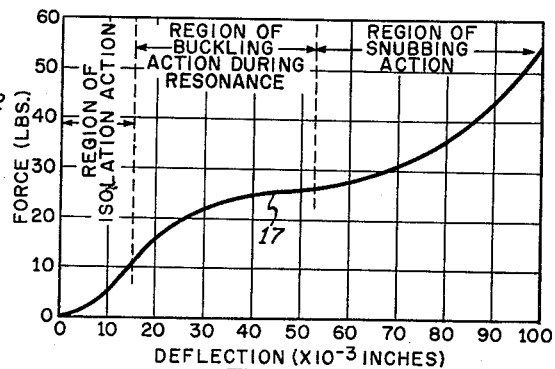
FIG. 5 is a graph showing the nonlinear characteristics of the improved isolator.

In the arrangement shown in FIG. 1, the respective isolators are secured in place on the inside rigid planar surfaces of a body such as a fixed base provided by spaced brackets 13, 14 by a suitable adhesive provided on the outside surface of the closing wall 12. As shown, the isolators are arranged in spaced pairs on the respective brackets to reduce the transmission of oscillatory motion from a vibratory body such as a housing 15 in the directions of the arrows 16 with respect to the brackets of the fixed base with which it is coupled. As shown, the planar rigid surface of the vibratory body or housing 15 is adjacent and parallel to the related planar surfaces of the rigid body to which the isolators are secured. The spacing between the brackets and housing and the thickness of the elastic piece are such that the isolators are statically loaded in compression. This condition for one of the walls 11 of the respective isolators is represented in FIG. 4A of the drawing. Upon further compression due to the travel of the housing 15 in the direction of the arrows 16 during vibration with respect to the brackets 13, 14, the respective walls 11 buckle as represented in FIG. 4B. The rate of resistance to compression of the elastic piece accordingly decreases as shown by the portion of curve in FIG. 5 of decreasing slope 17. When the walls 11 of the unitary elastic piece are pressed flat against the base wall 12 as shown in FIG. 4C, the slope of the curve in FIG. 5 increases showing an increased rate of resistance to further compression. The spring characteristics of the improved isolators are accordingly nonlinear in a frequency range including resonance.

Figure 6:
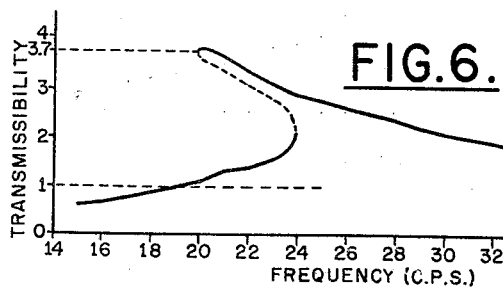
FIG. 6 is a further graph showing the transmissibility of an isolator in its resonant frequency range.

Ordinary vibration mountings with a linear spring characteristic have a fixed point of resonant frequency and are accordingly designed for use under conditions where shock vibrations at this value are not contemplated. In the improved vibration and shock isolator where the spring characteristic is nonlinear, the amplitude of the resonant frequency is reduced and widened in range because of the change in the spring characteristic as this condition is approached. The curve in FIG. 6 shows the transmissibility of the improved nonlinear characteristic elastic isolator in the range of its natural period of resonance reaching a maximum amplification in this instance at a frequency of twenty cycles per second and attenuating vibrations at frequencies above forty-two cycles per second.

The damping losses of the improved isolator result from surface friction of the buckled walls of the isolator as well as from internal hysteresis as buckling occurs in the walls. The improved isolator has high damping losses during resonant conditions and low damping losses in its transmission reducing frequency range of normal operation.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. A vibration and shock isolator for coupling a vibratory body with a rigid planar surface and a body with a second rigid planar surface adjacent and normally parallel to the planar surface of the vibratory body in a frequency range including resonance comprising a unitary piece of resilient material having an egg crate cell pattern arranged in sandwiched condition between the bodies with the walls of the cells in normally perpendicular relation to the planar surfaces of the bodies buckling under compressive loading with the characteristics of a nonlinear spring.

2. An isolator of the character claimed in claim 1, in which the piece includes a wall perpendicular to the buckling walls that closes one of the faces of the cell pattern.

3. An isolator of the character claimed in claim 1, in which the buckling walls of each of the cells of the pattern are square.

4. A vibration and shock isolator for reducing the transmission of oscillatory motion from a vibratory body with a rigid planar surface to a body with a second rigid planar surface adjacent and normally parallel to the planar surface of the vibratory body in a frequency range including resonance comprising a unitary piece of rubber having an egg crate cell pattern arranged in sandwiched condition between the bodies with the walls of the cells in normally perpendicular relation to the planar surfaces of the bodies buckling under compressive loading with the characteristics of a nonlinear spring.

5. An isolator of the character claimed in claim 4, in which the unitary piece of rubber includes a wall perpendicular to the buckling walls that closes one of the faces of the cell pattern.

6. An isolator of the character claimed in claim 4, in which the buckling walls of each of the cells of the pattern are square.

References Cited in the file of this patent

UNITED STATES PATENTS

| | | |
|---|---|---|
| 145,815 | Price | Dec. 23, 1873 |
| 1,853,617 | Hutchcroft | Apr. 12, 1932 |
| 2,105,997 | Church | Jan. 18, 1938 |
| 2,135,657 | Church | Nov. 8, 1938 |
| 2,597,878 | Lee | May 27, 1952 |

FOREIGN PATENTS

| | | |
|---|---|---|
| 667,157 | France | June 4, 1929 |
| 659,675 | Great Britain | Oct. 24, 1951 |